(12) United States Patent
Lords et al.

(10) Patent No.: US 9,369,474 B2
(45) Date of Patent: Jun. 14, 2016

(54) ANALYTICS DATA VALIDATION

(71) Applicant: Adobe Systems Incorporated, San Jose, CA (US)

(72) Inventors: Jacob D. Lords, Lehi, UT (US); Peter R. Fransen, Lehi, UT (US); Jeffrey M. Day, Springville, UT (US)

(73) Assignee: Adobe Systems Incorporated, San Jose, CA (US)

( * ) Notice: Subject to any disclaimer, the term of this patent is extended or adjusted under 35 U.S.C. 154(b) by 65 days.

(21) Appl. No.: 14/227,091

(22) Filed: Mar. 27, 2014

(65) Prior Publication Data

US 2015/0281253 A1 Oct. 1, 2015

(51) Int. Cl.
| | |
|---|---|
| H04L 29/06 | (2006.01) |
| G06F 15/173 | (2006.01) |
| G06F 7/04 | (2006.01) |
| H04L 29/08 | (2006.01) |
| G06F 21/62 | (2013.01) |
| H04L 12/26 | (2006.01) |
| G11B 20/00 | (2006.01) |

(52) U.S. Cl.
CPC .............. *H04L 63/123* (2013.01); *G06F 21/62* (2013.01); *H04L 63/0428* (2013.01); *H04L 67/02* (2013.01); *G06F 21/6209* (2013.01); *G06F 21/6218* (2013.01); *G06F 2221/2107* (2013.01); *G11B 20/0021* (2013.01); *H04L 29/08099* (2013.01); *H04L 43/08* (2013.01)

(58) Field of Classification Search
CPC .................. G06F 21/6218; G06F 2221/2107; G06F 21/6209; G11B 20/0021; H04L 43/08; H04L 29/08099
USPC ................ 726/22, 26; 713/165; 709/224, 225
See application file for complete search history.

(56) References Cited

U.S. PATENT DOCUMENTS

| | | | | |
|---|---|---|---|---|
| 2002/0095567 | A1* | 7/2002 | Royer et al. ................... | 713/150 |
| 2002/0174344 | A1* | 11/2002 | Ting ............................... | 713/185 |
| 2005/0005171 | A1* | 1/2005 | Oliphant ........................ | 713/201 |
| 2010/0114964 | A1* | 5/2010 | Kerschbaum et al. ........ | 707/783 |
| 2010/0332962 | A1* | 12/2010 | Hammer et al. ............... | 715/205 |
| 2012/0106735 | A1* | 5/2012 | Fukuda .......................... | 380/255 |
| 2012/0167218 | A1* | 6/2012 | Poornachandran et al. .... | 726/24 |
| 2012/0260098 | A1* | 10/2012 | Jacobs ........................... | 713/176 |

* cited by examiner

*Primary Examiner* — Aravind Moorthy
(74) *Attorney, Agent, or Firm* — Wolfe-SBMC

(57) ABSTRACT

Analytics data validation techniques are described. In one or more implementations, an analytics service collects analytics data from a client device that describes web content and consumption of the web content by the client device. The collected analytics data includes encrypted analytics data that is not accessible by the client device and dynamic analytics data that describes the consumption of the web content by the client device. The encrypted analytics data is decrypted and a determination is made as to whether the collected analytics data is valid using the decrypted analytics data based on whether the decrypted analytics data includes expected parameters or that the dynamic analytics data is consistent with the decrypted analytics data. Responsive to a determination that the collected analytics data is valid, use of the collected analytics data is permitted are part of a web content analysis.

20 Claims, 7 Drawing Sheets

500 ⟶

502
Collect analytics data, from a client device, that describes web content and consumption of the web content by the client device, the collected analytics data including encrypted analytics data that is not accessible by the client device and dynamic analytics data that describes the consumption of the web content by the client device

↓

504
Decrypt the encrypted analytics data

↓

506
Determine whether the collected analytics data is valid using the decrypted analytics data based on whether the decrypted analytics data includes expected parameters or that the dynamic analytics data is consistent with the decrypted analytics data

↓

508
Responsive to the determination that the collected analytics data is valid, permitting use of the collected analytics data are part of an analysis of the web content

602
Encrypt analytics data that is configured to describe web content, the encrypting performed such that the analytics data is not accessible by client devices as part of consumption of the web content

604
Expose the web content having the encrypted analytics data for consumption by the client devices, the web content configured to cause the client device to communicate the encrypted analytics data along with dynamic analytics data collected from the client devices that describes client-side interaction involving the web content to an analytics service via a network

*Fig. 6*

ANALYTICS DATA VALIDATION

BACKGROUND

Analytics data may be collected to gain information regarding consumption of web content. For example, analytics data may be used to describe a source of the web content (e.g., a website), characteristics of the web content (e.g., the "what is included"), and may also describe how the web content is consumed by a client device, e.g., a particular browser, display size, and other hardware and software components.

However, conventional techniques that are utilized to collect the analytics data are inherently untrustworthy as this data is typically received from an unauthenticated source, e.g., to support client-side analytics. Accordingly, the analytics data may be susceptible to errors and even corruption by malicious parties. This susceptibility of the analytics data may therefore cause doubt as to the accuracy of the analysis performed using this data, which may therefore hinder the perceived and actual usefulness of the data.

SUMMARY

Analytics data validation techniques are described. In one or more implementations, an analytics service collects analytics data from a client device that describes web content and consumption of the web content by the client device. The collected analytics data includes encrypted analytics data that is not accessible by the client device and dynamic analytics data that describes the consumption of the web content by the client device. The encrypted analytics data is decrypted and a determination is made as to whether the collected analytics data is valid using the decrypted analytics data based on whether the decrypted analytics data includes expected parameters or that the dynamic analytics data is consistent with the decrypted analytics data. Responsive to a determination that the collected analytics data is valid, use of the collected analytics data is permitted are part of a web content analysis.

In one or more implementations, a content provider encrypts analytics data that is configured to describe web content. The encryption is performed such that the analytics data is not accessible by client devices as part of consumption of the web content. The web content having the encrypted analytics data is exposed for consumption by the client devices. The web content is configured to cause the client device to communicate the encrypted analytics data along with dynamic analytics data collected from the client devices that describes client-side interaction involving the web content to an analytics service via a network.

In one or more implementations, a system includes one or more computing devices of an analytics service having one or more modules implemented at least partially in hardware. The one or more modules are configured to perform operations that include determining whether analytics data corresponding to web content is valid by determining that an encrypted portion of the analytics data is consistent with a portion of the analytics data that describes the consumption of the web content by the client device. The encrypted portion is encrypted by a content provider of the web content and is not accessible by the client device. Responsive to the determination that the collected analytics data is not valid, the analytics data is rejected from use as part of an analysis of the web content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 is a flow diagram depicting a procedure in an example implementation in which collected analytics data is verified using an encrypted portion of the data.

FIG. 6 is a flow diagram depicting a procedure in an example implementation in which web content is exposed by a content provider that includes encrypted analytics data.

DETAILED DESCRIPTION

Overview

Collection of analytics data, and especially client-side analytics data that describes consumption of web content by a client device, may be susceptible to error and corruption. This may cause the data to be untrustworthy and thus may be avoided for use in analysis of the web content, thereby removing a valuable data source from consideration.

Analytics data validation technique are described. In one or more implementations, encrypted data is used to validate analytics data and thus protect against inclusion of untrustworthy data from use in analysis of web content. The encrypted data, for instance, may be included with web content by a content provider. The web content may then be communicated to client devices for consumption, with the encrypted data protected from being accessed by the client devices. The encrypted data, along with dynamic analytics data collected at the client device describing client-side consumption of the web content, may then be communicated to an analytics service for processing.

The analytics service may then use the encrypted data to validate that the analytics data is suitable for use in analysis of consumption of the web content. This validation may be performed in a variety of ways. The analytics service may first determine whether the encrypted analytics data decrypts properly, e.g., corresponds to a cryptographic key that is associated with the web content.

The encrypted analytics data, when decrypted, may then be checked for consistency with the dynamic analytics data. This may include a determination of whether the dynamic analytics data attempts to override the encrypted analytics data, whether the dynamic analytics data includes parameters described by the encrypted analytics data, use of timestamp, source identification, includes a nonce, and so forth. If valid, the analytics data may be used as part of analysis of the web content and restricted from use if not valid. In this way, the trustworthiness of the analytics data used for the analysis may be improved. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
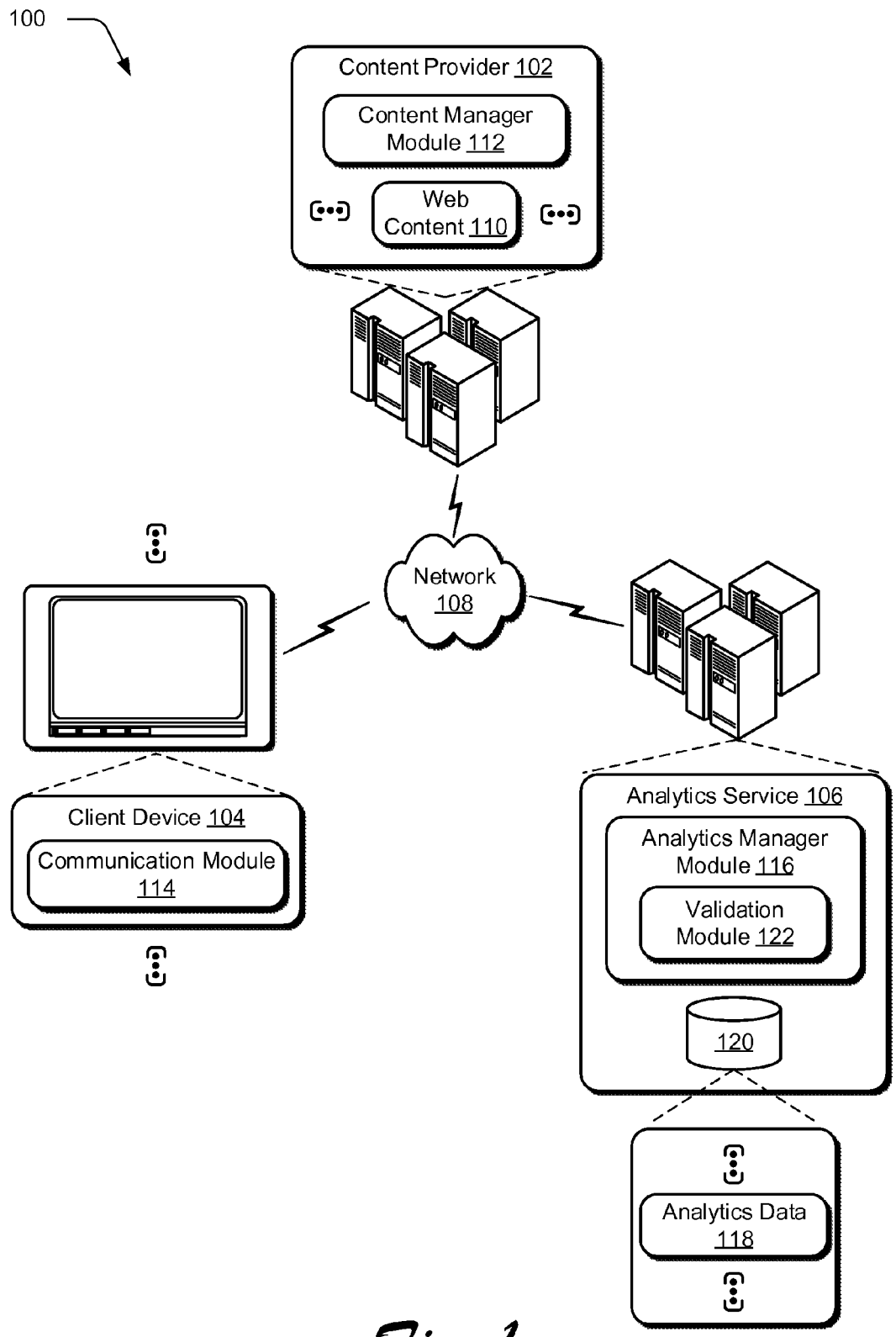
FIG. 1 is an illustration of an environment in an example implementation that is operable to employ techniques described herein relating to analytics data validation.

FIG. 1 is an illustration of an environment 100 in an example implementation that is operable to employ techniques described herein. The illustrated environment 100 includes a content provider 102, a client device 104, and an analytics service 106 that are communicatively coupled via a network 108. The computing devices that implement the content provider 102, the client device 104, and the analytics service 106 may be configured in a variety of ways.

Computing devices for instance, may be configured as desktop computers, laptop computers, a mobile device (e.g., assuming a handheld configuration such as a tablet or mobile phone as shown for the client device 104), multiple servers utilized by a business to perform operations "over the cloud" as shown as implementing the content provider 102 and analytics service 106, and so forth. Thus, the computing devices may range from full resource devices with substantial memory and processor resources (e.g., personal computers, game consoles) to a low-resource device with limited memory and/or processing resources (e.g., mobile devices, a dedicated camera, video recorder, and so on). Additionally, each of the computing devices may be representative of a plurality of different devices, such as and as further described in relation to FIG. 7.

The content provider 102 is illustrated as including web content 110 that is managed by a content manager module 112. The web content 110 may be configured in a variety of different for communication via the network 108, including as web pages, web media, advertisements, links, and so on, such as when the content provider 102 is configured to implement one or more web sites.

The client device 104, for instance, may include a communication module 114 that is representative of functionality to access and consume the web content 110 via the network 108. As such, the communication module 114 may be configured in a variety of different ways, such as a browser, web-enabled applications, third-party plugin, and so on.

The environment 100 is also illustrated as including an analytics service 106. The analytics service 106 includes an analytics manager module 116 that is representative of functionality to collect and analyze analytics data 118, the data is illustrated as stored in storage 120 of the analytics service 106. The analytics data 118 may be collected from a plurality of client devices 104 to describe consumption of the web content 110 by those devices. This consumption may be referred to as client-side analytics (i.e., client-side tracking) as opposed to server-side analytics such as analytics generated by the content provider 102. This analytics data is also referred to as static analytics data that is generated server-side by the content provider 102 to describe characteristics of the web content 110 and dynamic analytics data that describes characteristics of the consumption of the web content 110 by the client device 104.

As previously described, analytics data (and especially dynamic analytics data) may be inherently untrustworthy as it may originate from an unauthenticated source. For example, client-side tracking may be used to obtain dynamic analytics data that describes consumption of web content 110 by users and corresponding client devices 104 of the users, and thus is "dynamic" in that this consumption may change from client device to client device. Dynamic analytics data, for instance, may describe characteristics of the client device 104 (e.g., hardware and/or software) used to consume the web content, e.g., type of browser, configuration of the client device, order of web content 110 consumption, which "links" are selected, which of the web content 110 is rendered for viewing, and so on.

However, client-side analytics as described by the dynamic analytics data may have a perceived problem in that the data being collected is inherently untrustworthy as it comes from an authenticated source, e.g., the client device 104. Accordingly, cryptography may be used to send parameters known to the content provider 102 as part of the web content 110 in a way that may be used to validate the "trustworthiness" of the analytics data.

The content provider 102, for instance, may encrypt a portion of static analytics data for inclusion as part of the web content 110, e.g., using symmetric or asymmetric encryption. The static analytics data may describe characteristics of the web content 110 (e.g., "what" types of content, the content that is included, formats, how the content originated such as an IP address) as well as characteristics of a provider of the web content 110, e.g., the content provider 102 such as which web site, characteristics of the content provider 102, associations of the content provider 102 with other content providers (e.g., web site relationships), and so on.

This encrypted analytics data, when communicated with the web content 110, may thus be inaccessible to the client device 104, e.g., may not be consumed or accessed for viewing by a user of the client device 104. The web content 110, when consumed by the client device 104, may be configured to also collect dynamics analytics data that describes consumption of the web content 110 by the client device 104. This dynamic analytics data, along with the encrypted static analytics data, may then be communicated via the network 108 for processing by the analytics service 106. Although the analytics service 106 is illustrated as separate from the content provider 102, functionality represented by the analytics service 106 may also be included as part of the content provider 102 without departing from the spirit and scope thereof.

The analytics service 106 is illustrated as including an analytics manager module 116. The analytics manager module 116 is representative of functionality to perform one or more analytics processing operations that are configured to identify what web content 110 is being consumed, how that web content 110 is being consumed (e.g., an order of consumption, which software and/or hardware is being consumed, at what time, geographic locations), why the web content 110 is being consumed (e.g., through a link from an advertisement), and so forth.

The analytics service 106 is also illustrated as including a validation module 122. The validation module 122 is representative of functionality to validate whether the analytics data collected from the client device 104 "is what is says it is." For example, this validation may be utilized to protect against analytics data generated by malicious parties, generated through error by incorrect implementation of tracking (e.g., copying tracking functionality from other web content), and so on. Thus, the validation module 112 may be utilized to validate whether the collected analytics data is to be included as part of the analytics data 118 in storage 120 that is used by the analytics manager module 116 to perform web content 110 analytics. Validation may be performed in a variety of ways, further discussion of which is described below and shown in a corresponding figure.

Figure 2:
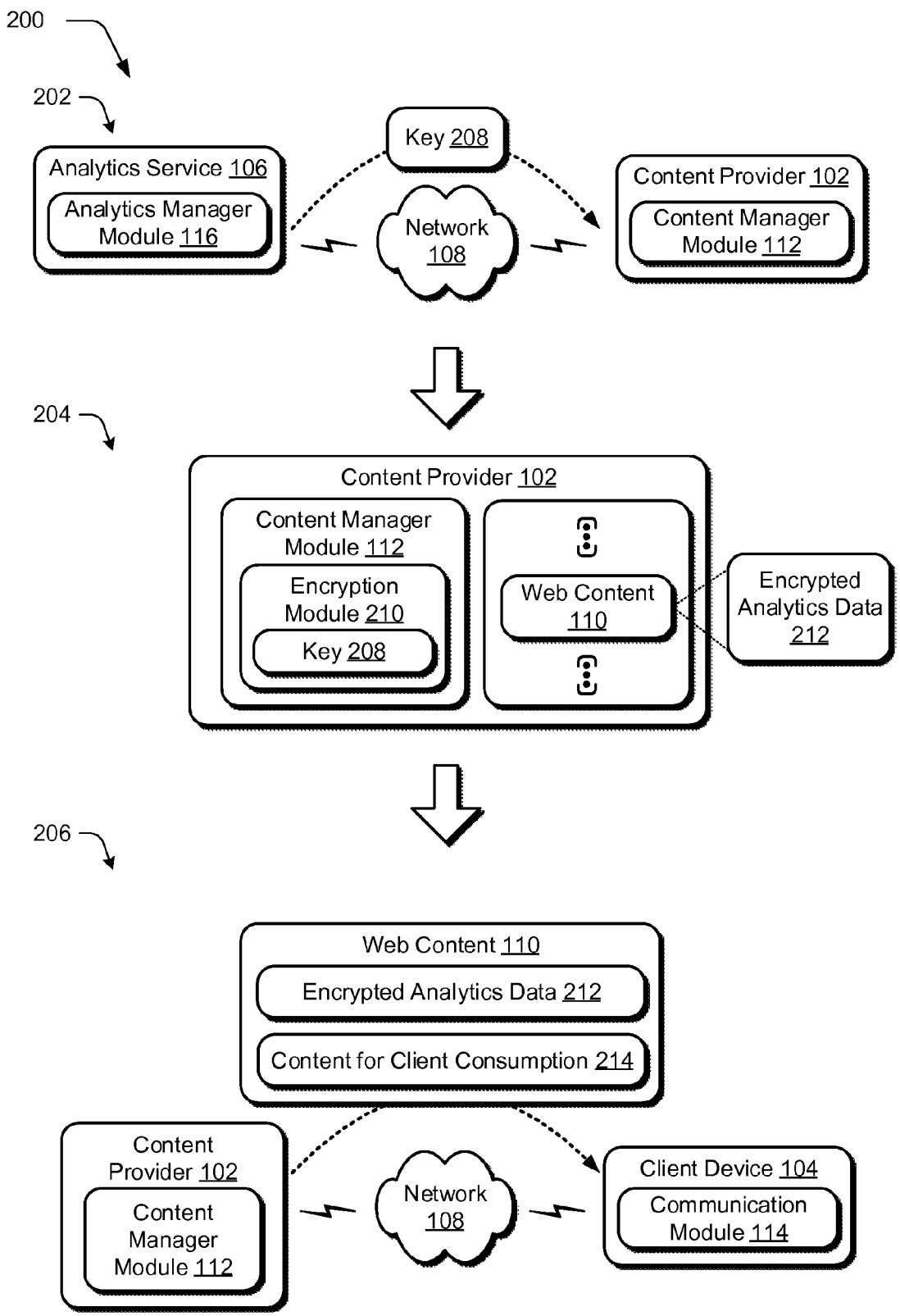
FIG. 2 depicts a system in an example implementation in which analytics data in web content is encrypted.

FIG. 2 depicts a system 200 in an example implementation in which analytics data in web content 110 is encrypted. The system 200 is illustrated using first, second, and third stages 202, 204, 206. At the first stage 202, an analytics manager module 116 of the analytics service 106 communicates a key 208 to the content provider 102 that is usable to encrypt content.

The key 208, for instance, may be communicated via the network 108, physically via a computer readable storage device, and so on. Further, the key 208 may take a variety of different forms, such as to support symmetric encryption, asymmetric encryption, and so on. Further, although shown as being communicated from the analytics service 106 to the content provider 102, the key 208 may originate from a variety of different sources, such as a third party service.

At the second stage 204, the key 208 is employed by the encryption module 210 to generate encrypted analytics data 212 for association with the web content 110. As previously described, a variety of different encryption techniques may be employed by the encryption module 210, such as to perform symmetrical encryption in which a matching key is used to perform encryption and decryption, asymmetrical encryption in which different keys are used to perform encryption and decryption, and so forth.

The encrypted analytics data 212 may take a variety of forms. For example, a variety of different parameters may be included as part of the encrypted analytics data 212 that may be thought of as static, and therefore are also referred to as static analytics data. This includes parameters that describe the web content 110 itself, such as types, formats, text, images, and other media that is included as part of the web content 110, and so on. The parameters may also describe how the web content originated (e.g., identify the content provider 102), characteristics of the content provider 102 (e.g., web pages served by the content provider, a web site that includes a webpage of the web content 110), and so forth.

Additionally, in one or more implementations the encryption module 210 may be configured to dynamically select which static analytics data is to be encrypted. For example, the encryption module 210 may dynamically select from a plurality of parameters to determine which parameters are to be encrypted. This selection, along with data describing which parameters were selected and even which parameters are not selected (which may also be included in an unencrypted form) as part of the encrypted analytics data 212. In this way, this selection may also be used as part of validation, e.g., to verify that the description of which parameters and encrypted or not encrypted is consistent with what is received.

The encrypted analytics data 212 may also be configured to describe which parameters are expected as part of dynamic analytics data that is to describe consumption of the web content 110 by the client device 104. For example, the encrypted analytics data 212 may describe which parameters are configured to be included as part of the dynamics analytics data to the analytics service 106 and thus consistency between what is received and what is expected to be received may be used as part of this validation. A variety of other validation techniques are further described in relation to FIG. 4.

At the third stage 206, the web content 110 is communicated from the content provider 102 to a client device 104 for consumption. The client device 104, for instance, may communicate a request (e.g., via a browser) to the content provider for the web content 110, e.g., a web page. The client provider may then configure the web content to include the encrypted analytics data 212 along with content for client consumption 214 (e.g., to include a timestamp), may select from already configured web content 110 having the encrypted analytics data 212, and so on. The web content 110 may then be communicated via the network 108 (e.g., the internet) for consumption by the client device 104, an example of which is described as follows and shown in a corresponding figure.

Figure 3:
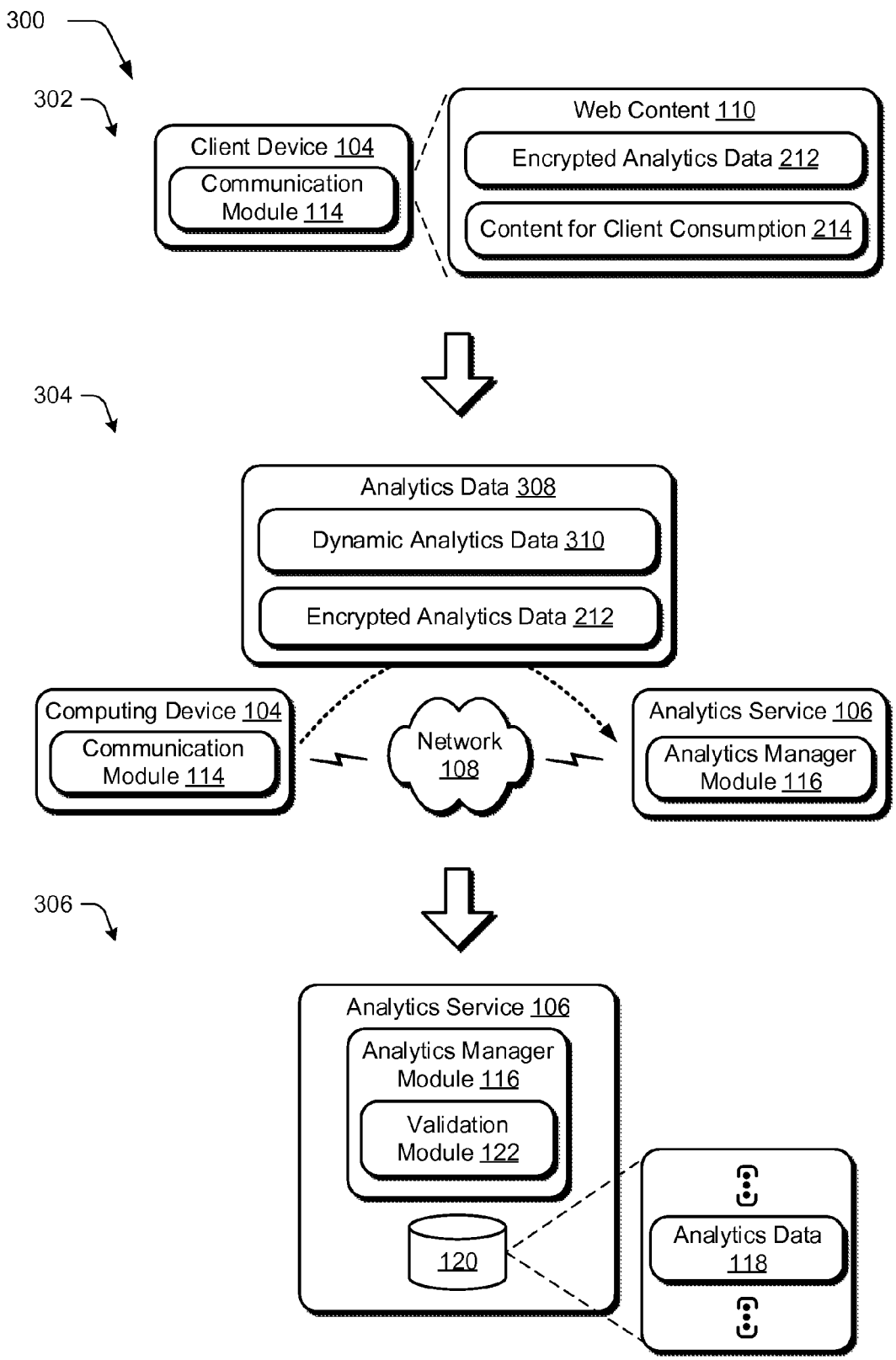
FIG. 3 depicts a system in an example implementation in which web content associated with encrypted analytics data of FIG. 2 is consumed.

FIG. 3 depicts a system 300 in an example implementation in which the web content 110 including the encrypted analytics data 212 of FIG. 2 is consumed. The system 300 is also illustrated using first, second, and third stages 302, 304, 306. At the first stage 302, a communication module 114 consumes the web content 110 received in FIG. 2. This consumption may be performed in a variety of ways, such as via a browser, a web-enabled application, plugin modules, and so on.

During this consumption, the content for client consumption 214 may be accessed by the client device 104 whereas the encrypted analytics data 212 is not available for access due to the encryption. In other words, a user of the client device 104 may not "see" the actual data included in the encrypted analytics data 212 but rather an encrypted form of that data.

Dynamic analytics data 310 may be generated as part of this consumption which describes how the web content 110, and more particularly the content for client consumption 214, is consumed. This may include parameters that describe characteristics of software used to consume the web content 110 (e.g., browser, version, operating system), hardware (e.g., screen size, type, processor, resolution), time at which the content is consumed, from where the content is obtained, when the content was obtained, and so forth.

At the second stage 304, the analytics data 308 is communicated to the analytics service 106 via the network. The analytics data 308 includes the dynamic analytics data 310 that described client-side consumption along with encrypted analytics data 212, e.g., the static analytics data generated by the content provider 102.

At the third stage 306, the analytics service 106 employs a validation module 122 to validate the analytics data 308 to determine whether the data is to be included as part of the analytics data 118 to be analyzed by the analytics manager module 116. For example, this validation may be performed to protect against analytics data 308 that was generated in error (e.g., through inadvertent copying of tracking code from one website to another) or by a malicious party. The validation may be performed in a variety of ways, further discussion of which may be found in the following and described in a corresponding figure.

Figure 4:
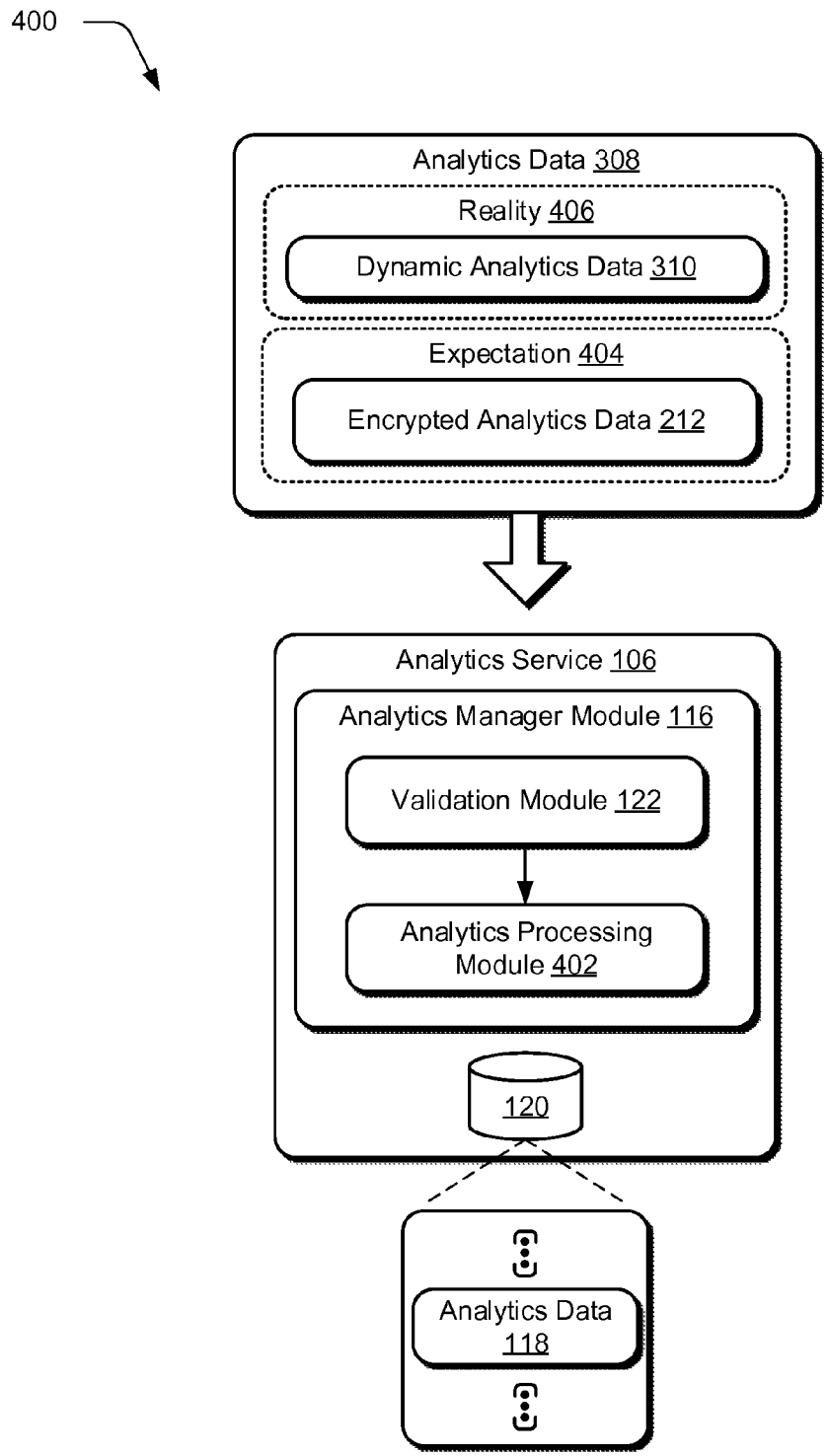
FIG. 4 depicts a system in an example implementation in which the analytics data collected from the client device in FIG. 3 is validated.

FIG. 4 depicts a system 400 in an example implementation in which the analytics data collected from the client device 104 in FIG. 3 is validated. As previously described, validation performed by the validation module 122 may help protect against use of erroneous analytics data in performing analytics, functionality of which is represented by an analytics processing module 402. A variety of different types of analytics may be performed to discover meaningful patterns, such as to quantify perform of web content 110 and how interaction with the web content 110 is performed, e.g., to promote page views, use of advertisements, and so on.

The validation module 122, for instance, may first determine whether encrypted analytics data 212 decrypts properly, i.e., that use of key as part of a decryption process results in meaningful data that is usable by the analytics processing module 402. If not, the analytics data 308 may be rejected and further processing may cease to conserve processing resources.

Once decrypted, a determination may also be made that the encrypted analytics data 212 (e.g., the static analytics data) includes expected parameters. In other words, the validation module 122 may "look" for particular parameters and if not so included in the encrypted analytics data 212, the analytics data 308 as a whole may be rejected.

The validation module 122 may also employ techniques in which the encrypted analytics data 212 is used to verify the dynamic analytics data 310. The encrypted analytics data 212, for instance, may describe an expectation 404 that is compared with a reality 406 described by the dynamic analytics data 310. The encrypted analytics data 212, for instance, may describe which parameters are to be included in the dynamic analytics data 310 as well as which parameters of static analytics data are to be encrypted or not encrypted as previously described.

The encrypted analytics data 212 may also include values for parameters (e.g., matching parameters) that may be compared, such as a time stamp, an IP address of where the web content 110 originated, and so on. Other data may also be included in the encrypted analytics data 212, such as a nonce.

These validation techniques may support a variety of different usage examples. In a first such example, a content provider may obtain a key as previously described to form encrypted analytics data 212 that includes a page name, timestamp (e.g., time of "hit"), IP address, and browser string and encodes it responsive to the "hit," i.e., the request for the web content 110. The communication module 114 of the client device 104 may then add dynamic analytics data 308 that were unknown to the content provider 102, such as selection (e.g., "clicks") performed by the user, screen width, and so on. Since the dynamic analytics data does not attempt to override the encrypted analytics data 210, the validation module 122 may make a validation determination and permit use of this data as part of the analytics data 118 in storage 120.

In a second such example, a malicious use may desire inclusion of inaccurate data to skew the analytics being perform. This user, for instance, may request web content 110 (e.g., a webpage) from a content provider 102. The malicious user may then cause false hits to report inaccurate analytics data 308 using different browsers, IP addresses, page names, and so on. The validation module 122 may therefore reject this analytics data 308 as the encrypted analytics data 212 does not correspond to the dynamic analytics data 310, e.g., the expectation 404 is not matched by the reality 406 in the analytics data 308.

In another example, a user may implement tracking on their website, but does not know how to do it. Therefore, the user may go to another website, copy their tracking, and push their web content live with the wrong tracking data. The validation module 122 may also reject this data for a variety of different reasons, e.g., a timestamp is too old, browser and IP addresses do not correspond between the encrypt analytics data 212 and the dynamic analytics data 310, and so on.

A variety of other examples are also contemplated in which the validation module 122 may be utilized to promote use of valid analytics data. For example, signatures may be used instead of encrypted strings such that when a request a received by a content provider 102 for web content 110, a tracking link with plaintext parameters, a timestamp, a hash of those parameters, and a key 208 may be generated. When the communication module 114 sends a "hit" including the analytics data 308, the validation module 122 is able to hash to parameters together and see whether this data matches what was sent by the content provider 102 to the analytics service 106. A variety of other examples are also contemplated as further described in relation to the following procedures.

Example Procedures

The following discussion describes analytics data validation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

FIG. 5 depicts a procedure 500 in an example implementation in which collected analytics data is verified using an encrypted portion of the data. An analytics service collects analytics data from a client device that describes web content and consumption of the web content by the client device. The collected analytics data includes encrypted analytics data that is not accessible by the client device and dynamic analytics data that describes the consumption of the web content by the client device (block 502). The encrypted analytics data 212 may describe static analytics data generated by a content provider 102. This data may include description of an expectation 404 of which dynamics analytics data 310 is received, i.e., the "reality" 406, including which parameters are to be included, expected values of those parameters, and so on.

The encrypted analytics data is decrypted (block 504) and a determination is made as to whether the collected analytics data is valid using the decrypted analytics data based on whether the decrypted analytics data includes expected parameters or that the dynamic analytics data is consistent with the decrypted analytics data (block 506). This may include whether the dynamic analytics data 310 attempts to override the encrypted analytics data 212 (e.g., has conflicting values for matching parameters), includes describe parameters, and so forth as previously described.

Responsive to a determination that the collected analytics data is valid, use of the collected analytics data is permitted are part of a web content analysis (block 508). The validation module 122, for instance, may pass the analytics data 308 for inclusion with other analytics data 118 that has be verified to permit processing by the analytics processing module 402. In this way, "good" data may be used for the analysis with an increased likelihood of being accurate, e.g., not originating in error or from a malicious party.

FIG. 6 depicts a procedure 600 in an example implementation in which web content is exposed by a content provider that includes encrypted analytics data. A content provider encrypts analytics data that is configured to describe web content. The encryption is performed such that the analytics data is not accessible by client devices as part of consumption of the web content (block 602). The content provider 102, for instance, may use a key 208 to encrypt static parameters such as an IP address, name, timestamp, nonce, and so on. Further, this encryption may be performed response to receipt of a request for the web content 110 by the content provider 102 from a client device 104.

The web content having the encrypted analytics data is exposed for consumption by the client devices. The web content is configured to cause the client device to communicate the encrypted analytics data along with dynamic analytics data collected from the client devices that describes client-side interaction involving the web content to an analytics service via a network (block 604). The web content 110, for instance, may be configured to cause the communication module 114 (e.g., a browser) to communicate analytics data 308 to the analytics service 106, the data including dynamic analytics data 310 as well as the encrypted analytics data 212 that is not accessible by the client device 104. In this way, integrity of the analytics data 308 may be protected, even when originating from an untrusted source. A variety of other examples, including hashing as part of the encrypted analytics data 212, are also contemplated as previously described.

Example System and Device

Figure 7:
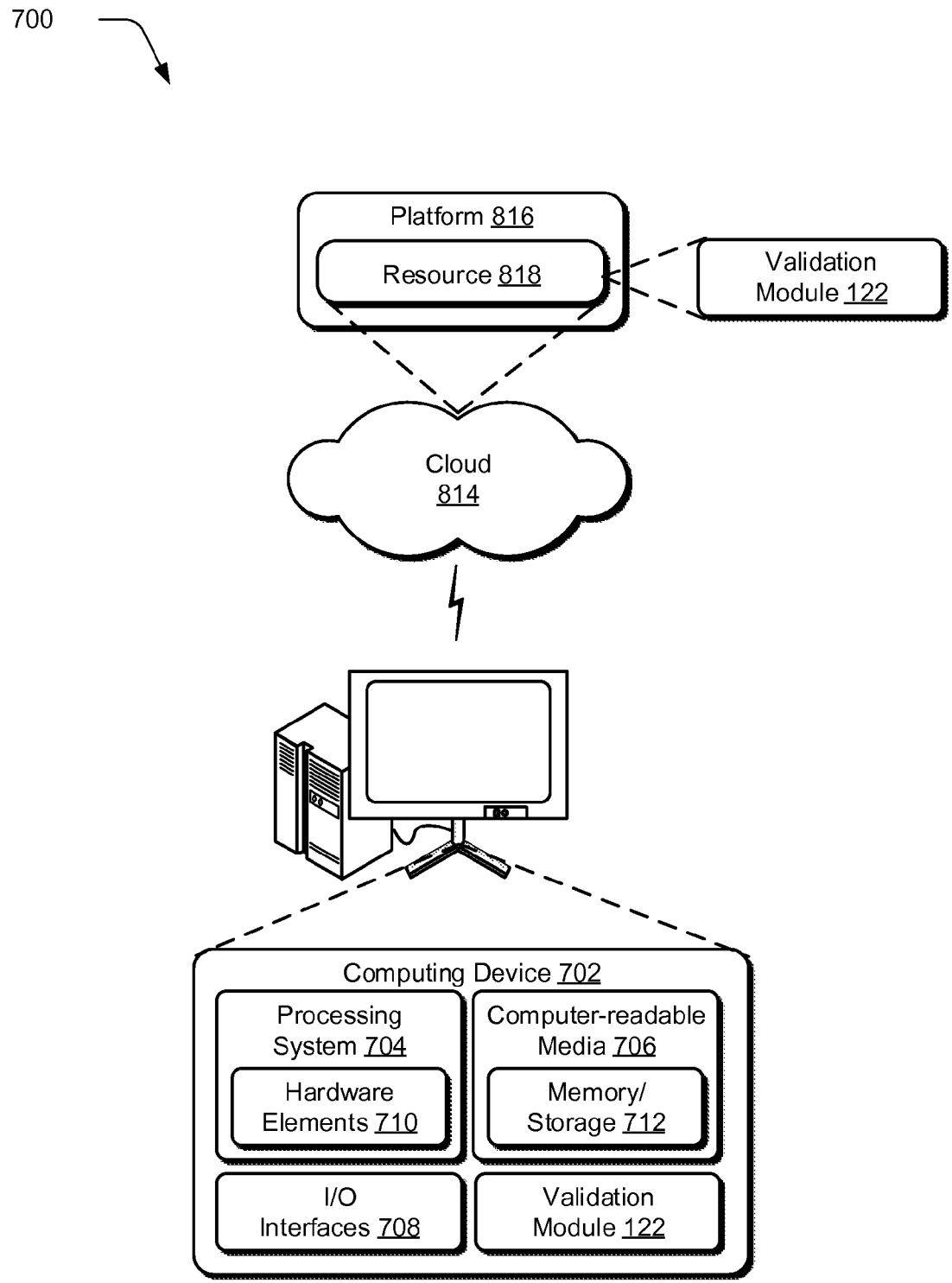
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the validation module 122 on the computing device 702 and/or as part of the platform "over the cloud." The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices of an analytics service having one or more modules implemented at least partially in hardware, the one or more modules configured to perform operations comprising:
   collecting analytics data, by the one or more computing devices from a client device, that describes web content and consumption of the web content by the client device, the collected analytics data including encrypted analytics data that is not accessible by the client device and dynamic analytics data that describes the consumption of the web content by the client device;
   decrypting, by the one or more computing devices, the encrypted analytics data;
   determining, by the one or more computing devices, whether the collected analytics data is valid using the decrypted analytics data based on whether the decrypted analytics data correctly specifies expected parameters that are included in the dynamic analytics data, or that the dynamic analytics data is consistent with the decrypted analytics data via verification that the dynamic analytics data received matches expected dynamic analytics data provided in the decrypted analytics data; and
   responsive to the determination that the collected analytics data is valid, permitting, by the one or more computing devices, use of the collected analytics data are part of an analysis of the web content.

2. A method as described in claim 1, wherein the expected parameters include an identification of a source of the web content.

3. A method as described in claim 2, wherein the determining that the dynamic analytics data is consistent with the decrypted analytics data includes determining whether the identification of the source of the web content matches an identification of the source of the web content from the dynamic analytics data.

4. A method as described in claim 1, wherein the decrypted analytics data is determined to be consistent with the dynamic analytics data by comparing a timestamp in the encrypted analytics data with a timestamp from the dynamic analytics data.

5. A method as described in claim 1, wherein the decrypted analytics data is determined to be consistent with the dynamic analytics data by determining that the dynamic analytics data does not attempt to override the decrypted analytics data.

6. A method as described in claim 1, wherein the dynamic analytics data describes characteristics of software or hardware used by the client device to consume the web content.

7. A method as described in claim 1, wherein the encrypted analytics data includes one or more parameters that are static as set by a content provider of the web content.

8. A method as described in claim 7, wherein one or more parameters are selected for encryption from a plurality of parameters that are static by the content provider such that at least one of the plurality of parameters that is not selected is included with the web content in an unencrypted form.

9. A method as described in claim 1, wherein the encrypted analytics data includes a nonce.

10. A method as described in claim 1, wherein the web content is configured to cause the client device to communicate the analytics data to the analytics service via a network.

11. A method implemented by one or more computing devices of a content provider having one or more modules implemented at least partially in hardware, the one or more modules configured to perform operations comprising:
   encrypting analytics data, by the one or more computing devices, that is configured to describe web content, the encrypting performed such that the analytics data is not accessible by client devices as part of consumption of the web content;
   exposing the web content, by the one or more computing devices, having the encrypted analytics data for consumption by the client devices, the web content configured to cause the client device to communicate the encrypted analytics data along with dynamic analytics data collected from the client devices that describes client-side interaction involving the web content to an analytics service via a network.

12. A method as described in claim 11, wherein the encrypted analytics data includes a description of one or more characteristics of a request made for the web content.

13. A method as described in claim 11, wherein the encrypted analytics data includes a description of a source of the web content.

14. A method as described in claim 11, further comprising selecting one or more parameters for encryption from a plurality of parameters that are static such that at least one of the plurality of parameters that is not selected is included with the web content in an unencrypted form.

15. A system comprising:
   one or more computing devices of an analytics service having one or more modules implemented at least partially in hardware, the one or more modules configured to perform operations comprising:
      determining whether analytics data corresponding to web content is valid by determining that an encrypted portion of the analytics data is consistent with a portion of the analytics data that describes the consumption of the web content by the client device, the encrypted portion encrypted by a content provider of the web content and is not accessible by the client device; and
      responsive to the determination that the analytics data is not valid, rejecting the analytics data from use as part of an analysis of the web content and continuing analysis without the analytics data.

16. A system as described in claim 15, wherein the encrypted analytics data portion is determined to be consistent with the consumption portion of the analytics data by comparing a timestamp in the encrypted analytics data portion with a timestamp from the consumption portion of the analytics data.

17. A system as described in claim 15, wherein the encrypted analytics data portion is determined to be consistent with the consumption portion of the analytics data by determining that the consumption portion of the analytics data does not attempt to override the encrypted analytics data portion.

18. A system as described in claim 15, wherein the consumption portion of the analytics data describes characteristics of software or hardware used by the client device to consume the web content.

19. A system as described in claim 15, wherein the encrypted analytics data describes a source of the web content.

20. A system as described in claim 15, wherein the encrypted analytics data describes parameters that are to be included in the consumption portion of the analytics data.

\* \* \* \* \*